United States Patent [19]

Bruke

[11] Patent Number: 5,000,307
[45] Date of Patent: Mar. 19, 1991

[54] TRANSPORTATION DEVICE

[75] Inventor: Richard Bruke, Bunkeflostrand, Sweden

[73] Assignee: Spirac Engineering AB, Malmo, Sweden

[21] Appl. No.: 457,359

[22] Filed: Dec. 27, 1989

Related U.S. Application Data

[63] Continuation of Ser. No. 299,944, filed as PCT SE88/00264 on May 19, 1988, published as WO88/09301 on Dec. 1, 1988, abandoned.

[30] Foreign Application Priority Data

May 19, 1987 [SE] Sweden .................................. 8702071
May 19, 1987 [SE] Sweden .................................. 8702072

[51] Int. Cl.$^5$ .............................................. B65G 29/00
[52] U.S. Cl. .................................... 198/608; 198/668; 198/670
[58] Field of Search ............... 198/608, 666, 667, 668, 198/670, 657, 860.1, 860.3, 673

[56] References Cited

U.S. PATENT DOCUMENTS

| | | | |
|---|---|---|---|
| 1,906,395 | 5/1933 | Meeks | 198/608 |
| 2,357,220 | 8/1944 | Olson | 198/608 |

FOREIGN PATENT DOCUMENTS

| | | | |
|---|---|---|---|
| 1085465 | 7/1960 | Fed. Rep. of Germany . | |
| 2905665 | 8/1979 | Fed. Rep. of Germany . | |
| 689181 | 9/1930 | France . | |
| 116411 | 5/1987 | Japan | 198/670 |
| 360293 | 1/1973 | U.S.S.R. | 198/670 |
| 557012 | 6/1977 | U.S.S.R. | 198/670 |
| 1251136 | 10/1971 | United Kingdom . | |
| 1371238 | 10/1974 | United Kingdom . | |
| 2072122 | 9/1981 | United Kingdom . | |

*Primary Examiner*—Joseph E. Valenza
*Assistant Examiner*—Cheryl L. Gastineau

[57] ABSTRACT

A conveying apparatus comprises a first conveyor combination including a horizontal casing and a horizontal shaftless spiral drive element, and a second conveyor combination including a vertical casing and a vertical shaftless spiral drive element. The discharge section of the first casing and the free end of the first driving element are directed from the side towards the center axis of the second casing. The casing of the second conveyor combination has a cross section having either a corner or a longitudinally extending rib to increase the friction between the casing and the material which abuts against the same.

22 Claims, 5 Drawing Sheets

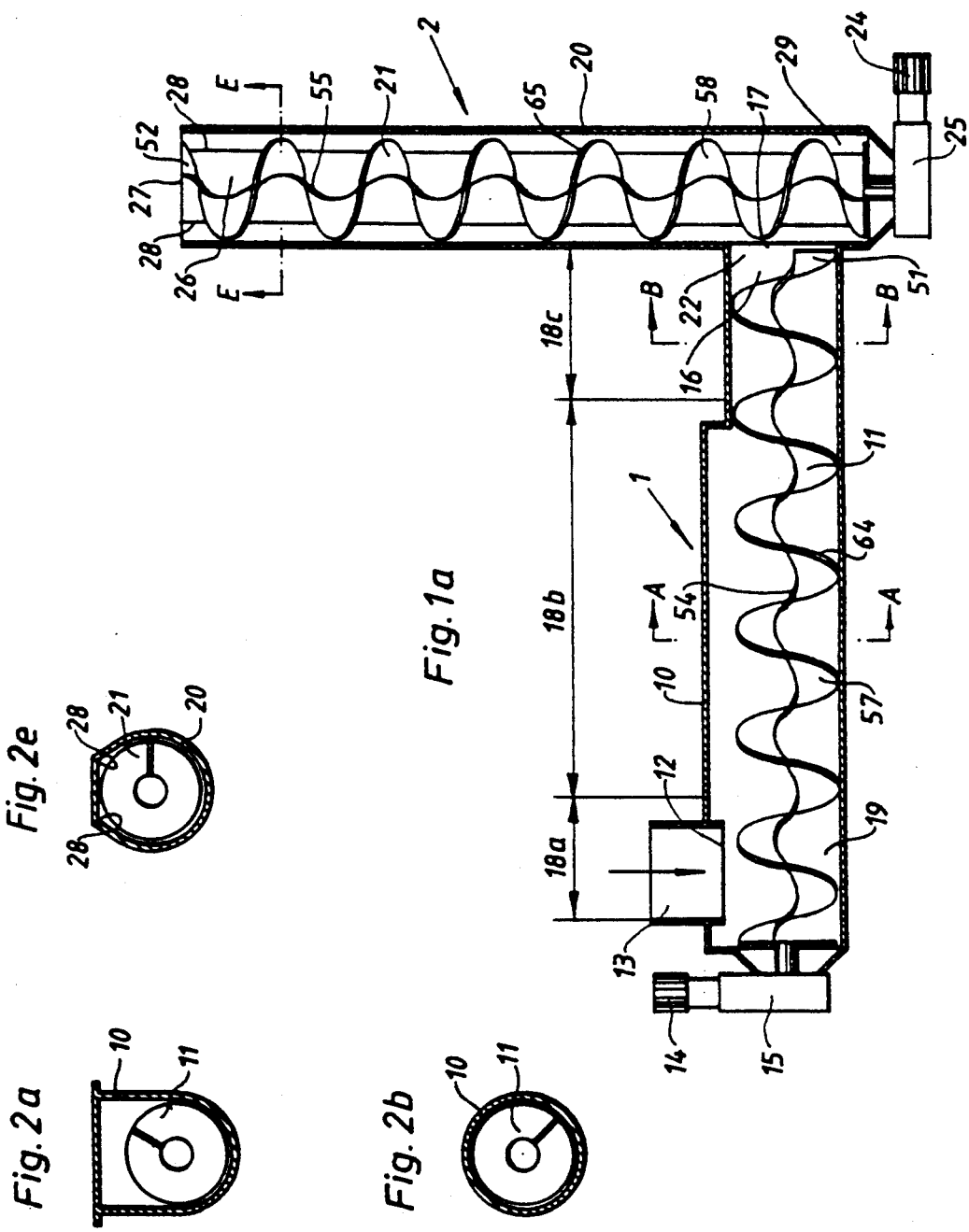

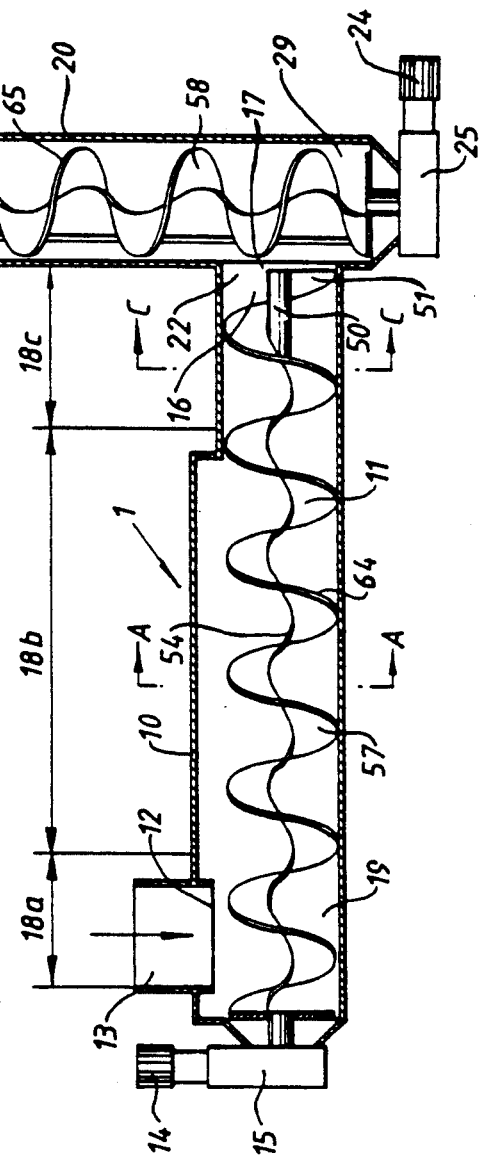
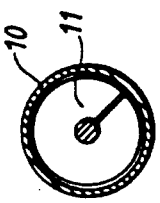
Fig. 1b
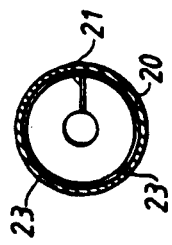
Fig. 2d  Fig. 2c

TRANSPORTATION DEVICE

This is a continuation of copending application(s) Ser. No. 07/299,944 filed as PCT SE88/00264 on May 19, 1988, published as WO88/09301 on Dec. 4, 1988 now abandoned and International Application PCT/SE88/00264 filed on May 19, 1988 and which designated the U.S.

FIELD OF THE INVENTION

The present invention relates to a method and apparatus for the conveying of material using two speed conveyors.

DESCRIPTION OF PRIOR ART

A need exists in many connections for the conveying of material, e.g. of bulk material, and not only of homogeneous goods but also of material which includes components of varying size, density, elasticity, moisture etc. Examples of such material are coal, coke, grain, refuse, wood chips etc. In many applications it is also necessary to convey articles from a lower level to a higher one. For reasons of space it is frequently important for the conveying to take place substantially vertically or along a steeply inclined path.

The type of conveyors appropriate in the abovementioned connection are scraper conveyors, screw conveyors or belt conveyors etc. Such conveyors are then arranged in inclined position and lift the material to the desired higher level.

In applications where screw conveyors are used, a spiral-form thread (screw) provided with a center shaft is present which is enclosed in a casing wherein the thread (screw) rotates. The arrangement represents a rigid and a heavy construction which even for relatively short conveying distances is supported at least at both its ends. The unloading, therefore, except where very short screws of a maximum length of 2-3 m are concerned, has to take place through an opening in the sides of the casing.

Conventional screw conveyors provided with a mechanical shaft which are used for vertical or steeply inclined conveyors have a number of well-known disadvantages, e.g.:

They have low efficiency and have to operate at high speed, normally 300-500 rpm.

The high speed causes high energy consumption and as a rule leads to rapid wear.

Unloading is rendered difficult and requires a large space, since it has to be done sideways.

The rigid construction in fixed supports and the limited space between threads, shaft and casing wall means that the material easily jams.

The rotating shaft renders impossible the transport of material which can twist itself round the shaft.

Moist smearing material tends to cake onto the inner wall of the casing and continuously reduce the "clearance" between screw and casing. Thus it is well-known for the rotation of the screw to be rendered difficult or hindered by this phenomenon.

The aforesaid disadvantages of vertical screw conveyors have the effect that conveyors for the transfer of material between different levels are built with a relatively small angle of inclination (normally 15°-45°) which naturally means a larger space requirement. The consequence are large buildings with high investment and operating costs associated therewith.

An application which generally occurs is the unloading to transport containers when the goods have to be lifted by at least 2 m. An inclined conveyor has the disadvantage that as a rule it makes it difficult to fill a container completely, since the conveyor has a limited unloading area. For bulk material the containers often have base dimensions 2×6 m. Likewise, it will be appreciated that the problem is accentuated when e.g. at a transloading station several containers placed adjoining one another are to be filled.

Generally it is so, that in a screw conveyor provided with a mechanical shaft—or in a spiral conveyor without a mechanical shaft—the conveying takes place in that the material transported rests against, and slides along, a driving surface of a screw (or of an endless scraper) which forms an oblique angle with the direction of conveying. If this relative movement between the material and the driving surface fails to take place, that is to say if the material sticks to the screw, no conveying of material whatever occurs in the direction towards the discharge end of the conveyor, but the material rotates around with the screw in a circular movement. To insure conveying towards the discharge end of the conveyor it is necessary, therefore, for the movement of the material in the circumferential direction of the screw to be slowed down so that the screw during its rotation pushes the material towards the discharge opening. In other words, in order that the material should be conveyed in the direction towards the discharge end, the sum of the friction forces between the goods transported and the rotating screw must be less than between the goods and the stationary casing.

It is evident that in a vertical or strongly inclined conveyor, which comprises a casing enclosing a screw provided with shaft, as a rule the forces with which the material is pressed against the casing will be less than the forces with which the material adheres to the screw. If no special measures are adopted to compensate this relationship, the result will be that the friction forces between the goods transported and the vertical casing will be smaller than the friction forces between the goods and the rotating means. To establish the preconditions for the transport of the material towards the discharge end, consequently, the friction between the material and the casing has to be increased. In accordance with prior art this is accomplished by choosing a high speed for the rotation of the screw and, throwing, with the help of centrifugal force the material against the casing of the conveyor. Vertical screw conveyor operate therefore, as already mentioned, at a high speed with the associated disadvantages in the form of high power consumption, rapid wear and low filling ration and/or efficiency.

To a vertical conveyor, which includes a casing and a screw equipped with a shaft located in the casing, the material which is to be lifted is supplied as a rule by means of a short screw which through an opening in the casing projects the material towards the center shaft of the screw. As a result the material at least partly fills out the feed-in zone of the conveyor and is forced out towards the inner boundary surface of the casing, thus creating the preconditions for the conveying of the material to the upper part of the conveyor and the discharge opening located there. However, the center shaft on the vertical conveyor of the conventional screw conveyor constitutes an obstacle to a good filling up of the feed zone though, and besides it is a fact that the total surface of the threads and the shaft of the screw together with the ductlike shape of the space between threads cause the material to stick to the screw and rotate with it which means that no conveying of material in the direction towards the discharge end is taking place. In addition to hindering the filling of the feed section of the screw conveyor and the increase of the friction forces between material and screw which the center shaft of the rotating screw brings about, it also renders impossible the conveying of material which can be twisted round the shaft and limits, moreover, greatly the conveying of material in large pieces.

It has been known previously that for the conveying of, among other things, the type of materials mentioned earlier in a horizontal plane or at a relatively small angle to it (maximum 30°–40°) a spiral-form thread without mechanical center shaft may be used, the thread rotating in a casing. The spiral thread is supported then only at one end of the spiral. The use of such shaftless spiral thread eliminates a number of the disadvantages of the conventional screw conveyor. A conveyor with shaftless spiral thread makes possible extremely light and compact constructions and, moreover, is appreciably more capacious than the "screw conveyor", as it lacks the obstacles which the center shaft and bearing constitute. This makes it possible to make use of appreciably higher filling ratios during transport and to operate with the same dimensions and transport capacity as a screw conveyor with shaft but at considerably lower speed. It may be used trouble-free for entangling or smearing goods or for goods of varying piece sizes. Moreover, it operates at low speed which ensures long operating life, high reliability, low maintenance cost and low power consumption.

SUMMARY OF THE INVENTION

The present invention seeks to provide a method and apparatus in which the aforementioned requirements are met, the disadvantages described are eliminated and where the advantages described in the preceding section of a conveyor with shaftless spiral thread are maintained on conveying material from a lower to a higher level at steep inclination or substantially vertically. In accordance with the invention this is achieved with a method and an apparatus which control the magnitude of flow in two conveyers with shaftless spiral thread.

In an embodiment of the invention a third upper conveyor (combination of shaftless spiral and track) is arranged which comprises a shaftless spiral without mechanical center shaft, where the spiral is located inside a means comprising a track whose cross-section in its lower part is of substantially circular shape with a diameter slightly exceeding the diameter of the spiral so as to allow the spiral to rotate in the track while being in contact with the inner boundary of the track. The third upper conveyor is fed by the second conveyor with material from underneath through an opening in the track. By rotating the third conveyor around the geometric axis of the discharge part of the second conveyor the discharge part of the third conveyor is adjusted to the desired direction.

BRIEF DESCRIPTION OF THE FIGURES OF THE DRAWING

The invention is described in more detail in connection with the figures of the drawing, where FIG. 1a, 1b show a section in the vertical plane through an arrangement in accordance with the invention in alternative embodiments.

FIGS. 2a—e show sections A—A, B—B, C—C, D—D and E—E in FIG. 1i a and FIG. 1b, respectively.

DETAILED DESCRIPTION OF PREFERRED EMBODIMENTS

Figure 3A:
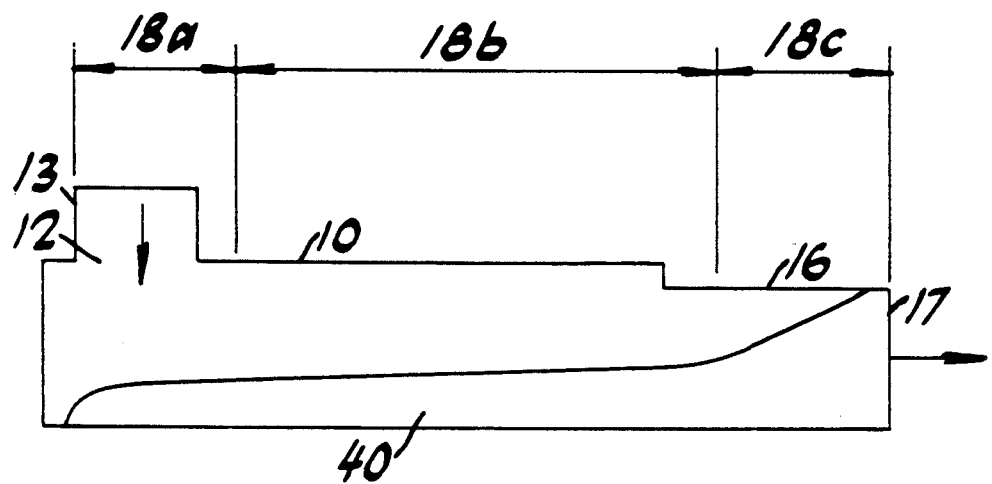
FIGS. 3a, 3b show the distribution of the material conveyed in the lower, substantially horizontal part of the arrangement in accordance with FIG. 1a and 1b, respectively.

FIGS. 1a and 1b illustrate the invention in an embodiment which shows the main construction and function of the invention. In the Figures will be found a first conveyor or combination 1 of a first tubular casing 10 and a first shaftless spiral 11, forming a screw-blade 57 with a boundary (edge) 54 facing towards the center and a boundary (edge) 64 facing away from the center, located in the casing. The casing as a rule has a substantially horizontal orientation. At one end the casing forms a feed section 19 provided with one or more feed openings 12 which as a rule connect to an upwardly directed feed drum or feed hopper 13. A motor 14 drives the shaftless spiral 11 via a change-gear and bearing assembly. The other end of the casing constitutes the discharge section 16 of the combination with its discharge opening 17. The spiral is solely supported in conjunction with the change-gear and bearing aggregate while the end 51 of the spiral which is located in the discharge section is entirely free. As a consequence of the elasticity of the spiral in the radial direction, the boundary 64 of the spiral facing away from the center rests against the casing in the base area of the latter except nearest the change-gear and bearing assembly 15.

In the discharge section the casing always has a substantially circular cross-section and surrounds the shaftless spiral with slight play. In the embodiment shown in FIG. 1b a substantially cylindrical body 50 is arranged in the discharge section 16 and located in the region of the geometric center axis of the spiral. The body is located in the central passage of the spiral and is surrounded by the spiral. In this embodiment too the spiral terminates with a free end 51 in the discharge section 16.

In FIG. 1a and 1b can be found also a second combination 2 of a construction substantially corresponding to that described above for the first combination. The second combination thus comprises a second casing 20 and a second shaftless spiral 21 located therein forming a screw blade 58 of, as a rule, substantially rectangular cross-section and a boundary (edge) 55 facing towards the center and a boundary (edge) 65 facing away from the center. The longitudinal axis of the casing in the second combination is of a substantially vertical orientation or forms a relatively wide angle with the horizontal plane. As a rule the angle exceeds 50°, preferably 70° and is frequently 90°. In the lower section of the combination 2 will be found a feed section 29 with a feed opening 22 which overlaps the discharge opening 17 of the first casing. The spiral is driven by a motor 24 via a change-gear and bearing assembly 25 located in the lower section of the combination below the region of the feed opening 22. The speed of rotation of the spiral is adjustable to the desired value by changing the gear ratio and/or the motor speed. At the other end of the casing can be found the discharge section 26 of the casing with a discharge opening 27 which in the embodiment shown is located in the axial direction of the shaftless spiral. The shaftless spiral terminates in the discharge section with a free end 52.

In the first combination in the region of the discharging section 16 the geometric center axis of the spiral and/or a central axis of the discharge section are directed towards the geometric center axis of the spiral 21 of the second combination. The area of the cross-section of the discharge opening 17 of the first casing 10 as a rule corresponds substantially to the area of the cross-section of the receiving casing 20, at least in the region of the feed section of the receiving casing, the two casings as a rule being tightly joined to one another. In some embodiments the discharge opening 17 is smaller. The free end 51 of the first spiral as a rule terminates closely adjoining the region through which passes the screw-blade 58 of the spiral 21 of the second combination.

Seen in axial direction of the first casing 10 the first combination 1 of shaftless spiral and casing is divided into a charging zone 18a, a discharge zone 18c which terminates with the discharge opening 17 and in some embodiments with a conveying zone 18b therebetween.

In FIG. 2a-2c are shown examples of the cross-sections of the respective zones. As a rule the cross-section of the casing in the conveying zone of the first casing is chosen to be U-shaped whereas in its discharge zone 18c it is as a rule circular. The casing encloses the spiral with slight play in the discharge zone. In applications where goods in large pieces are included in the material which is to be conveyed, the play is chosen to be relatively large so as to avoid any danger of jamming. In certain applications the casing has a substantially circular cross-section in the charging zone as well as in the discharge zone, the size of the cross-section of the respective zones as a rule being in agreement.

FIG. 2d shows an embodiment of the casing 20 of the second combination wherein the casing along its inner boundary surface is provided with at least one riblike means 23 which extends substantially in the longitudinal direction of the casing. The casing encloses the spiral 31 with relatively slight play.

FIG. 2e shows an alternative embodiment of the casing 21 of the second combination 2 where the cross-section of the casing is of an irregular shape and as a rule has one or several relatively sharp corners 28, as indicated in the figure.

The riblike means in FIG. 2d and the irregular shape or corners respectively in FIG. 2e serve to increase the friction between the respective casing and the material which abuts against the same.

Figure 3B:
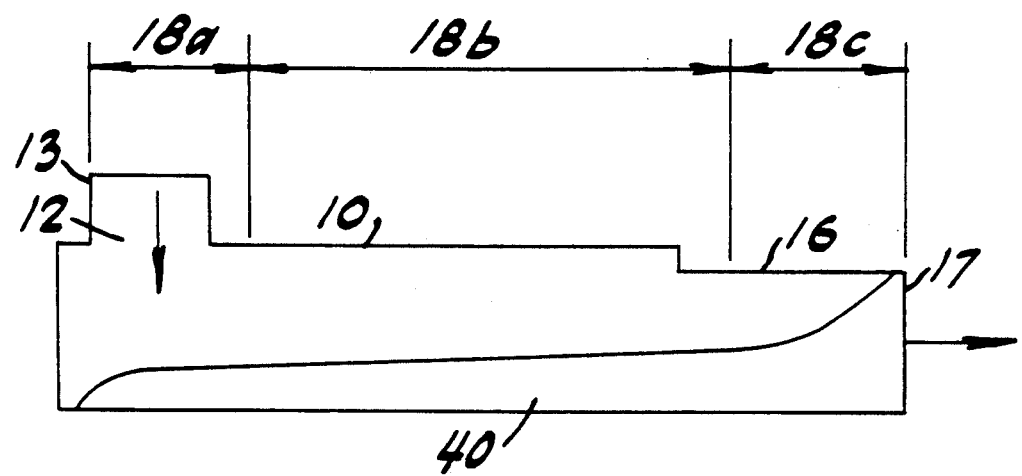

FIG. 3a and 3b show how during the conveying the material 40 in the first combination in the region adjoining the discharge opening 17 of the casing fills up substantially all the available space in the discharge section 16 of the combination. The cylindrically shaped body 50 according to the embodiment in FIG. 1b to a certain extent hinders material in the feed section of the second combination from falling back into the discharging section of the first combination.

Figure 4:
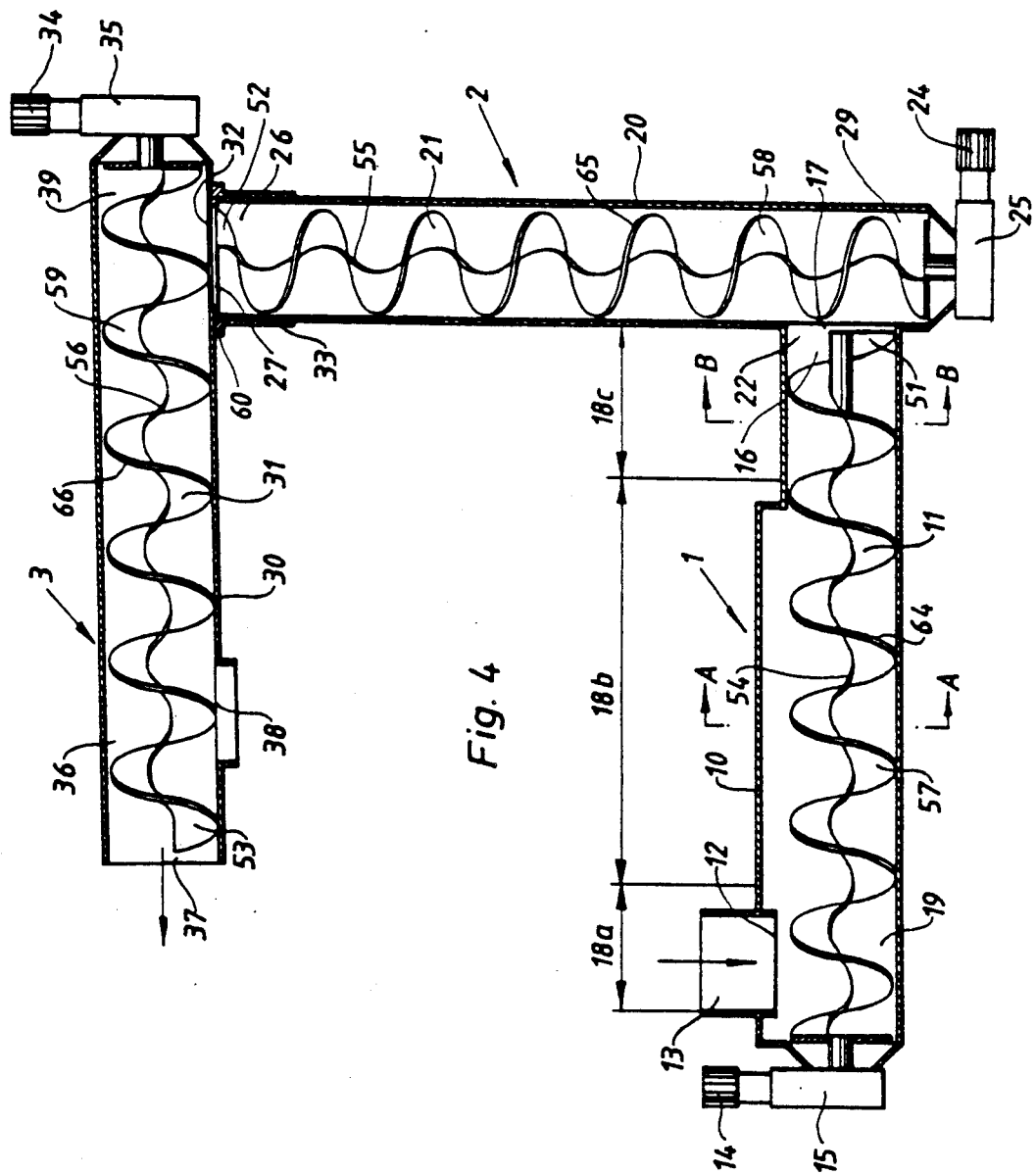
FIG. 4 shows a section in the vertical plane of an embodiment of the arrangement with a substantially horizontally directed upper conveying means and FIGS. 5a, 5b show the arrangement in accordance with FIG. 4 seen from above.

In FIG. 4 is shown an embodiment wherein the above described combinations 1 and 2 are completed by a third conveyor or combination 3 which also comprises a casing 30 and arranged in the casing is a rotating shaftless spiral 31 forming a screws-blade of as a rule substantially rectangular cross-section and with a boundary (edge) 56 facing towards the center and a boundary (edge) 66 facing away from the center. The spiral is driven via change-gear and bearing unit 35 by a motor 34 placed as a rule in conjunction with the feed end 39 of the casing. The speed of rotation of the spiral is adjustable by control of the speed of the motor and/or alteration of the gear ratio in the change-gear and bearing unit 35. The third combination is arranged in conjunction with the discharge section 26 of the second combination and is connected to the casing 20 of the second combination via a coupling and/or bearing unit 60 of circular cross-section. A joint 33, likewise of circular cross-section, encloses the discharging section 26 of the second casing and the third combination is rotatably adJustable in relation to the discharging section of the second casing. The joint in its section located adjoining the third casing forms a feed opening 32 to the third casing, this feed opening constituting a downwards facing opening in the third casing. In the region nearest the feed opening rotates the free end 52 of the second spiral as a rule closely adjoining the path or track of the screw-blade of the third spiral. As a consequence of the elasticity of the spiral in the radial direction the boundary 66 of the spiral facing away from the center rests against the casing in the bottom region of the latter except nearest the change-gear and bearing unit 35. The material which is conveyed through the discharge opening 27 of the second casing passes through the joint 33 and from underneath into the third casing through its feed opening.

The casing of the third combination is provided in its discharge section 36 with one or more discharge openings which are located one after the other in the longitudinal direction of the casing. As a rule one discharge opening 37 is located in the axial direction of the casing whereas one or more discharge openings 38 form openings in the casing facing downwards. The shaftless spiral 31 terminates in the discharge section of the casing with a free end 53 which is facing towards the discharge opening 37 located in axial direction of the casing. FIG. 4 shows an embodiment wherein the first combination is provided with a cylindrical body 50. In certain applications the first combination 1 has the construction shown in FIG. 1a, that is to say the combination lacks the cylindrical body 50.

Figure 5A:
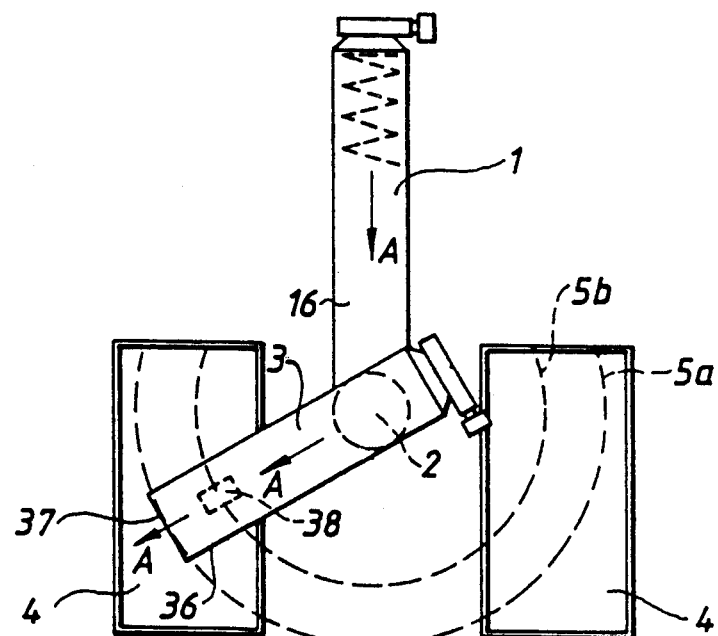
Figure 5B:
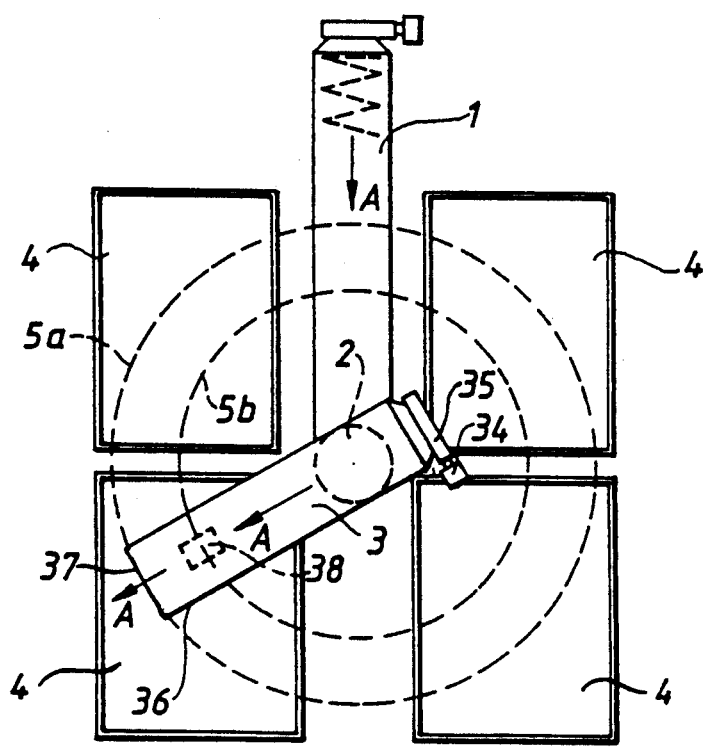

As shown in FIGS. 5a, 5b the discharge section 36 of the third combination is movable along the periphery of a circle when the third casing is turned in the bearing 60. As a result the combination is adjustable as required to deliver material to containers placed arbitrarily around the arrangement. The dispersed locations of the discharge openings mean that each discharge opening is moved along the periphery of a circle 5a-5b specific for the discharge opening making it feasible to obtain on unloading to a receiving container 4 a good distribution of the goods which are supplied to the container.

Material which is supplied to the first combination 1 through the feed opening 12 in the casing 10 is conveyed by means of rotation of the spiral 11 in the direction towards the discharge opening 17 of the first casing. As is evident from FIGS. 3a and 3b a certain accumulation of material is taking place in the region adjoining the discharge opening 17 of the first casing. As a result the material after it has passed out through the discharge opening of the first combination and into the casing 20 of the second combination 2, will substantially fill the space of the receiving casing in the region of the feed opening of the casing, since the relatively thin screw-blade 58 of the shaftless spiral 21 in the second casing in reality does not constitute an obstacle to the conveying of the material. The material passes into the second casing underneath as well as above the screw-blade 58 of the rotating spiral 21. Material supplied in the region of the feed opening 22 of the second casing forms material bridges with material passing in as well as with material already present in the second casing. As a result action of forces arise between the screw-blade 58 of the shaftless spiral and the material which is present in the casing and between material acted on by the screw-blade and material which surrounds the material acted on by the screw-blade, which also refers to material adjoining the inner boundary of the casing. The surrounding material, and to a certain degree also the material directly acted on by the spiral, abut against the inner boundary of the casing and are hindered by the friction effect from accompanying the spiral in its rotation. This brings about a relative movement between the screw-blade 58 of the second spiral and the material. Now, when the spiral thread passes through the materials, it is lifted up accordingly, and subsequently, after the spiral has passed by, it falls back towards the lower end of the casing. During the period when the material is lifted up by the spiral, however, material is supplied from the discharge section 16 of the first casing into the cavities which are formed underneath the material lifted up by the thread in the second casing, at the same time as the friction-promoting bridges mentioned are formed, underneath as well as above the screw-blade of the spiral thread, between material abutting against the screw-blade and surrounding material. Through successive rearrangement and injection of material from the first combinations, the whole space in the casing of the second combination is thus gradually filled with material.

One precondition for the material to be lifted is that the capacity of the material to accompany the spiral in its rotation has to be reduced, and this can be achieved provided the distribution of friction forces indicated in the foregoing passage exists. It thus has been found surprisingly that the supply of material provided by means of the first spiral, and which in the first instance goes into the cavities formed underneath the rotating thread of the second spiral, establishes friction forces between material bodies and between the material and its environment including the inner boundary of the casing) of a magnitude and direction which causes the material in the casing of the second combination to moves at a slower speed in the direction of rotation of the spiral than the spiral itself and, at least in certain parts, to be completely slowed down. As a result a substantially coherent material body is formed from the bottom of the casing, and this material body is moved towards the discharge end of the casing. It has been found surprisingly that when supply of material through the discharge opening 17 of the first casing ceases, the movement of material in the vertical direction also stops, since on rotation of the second spiral only a rearrangement of the material, but, by and large, no vertical conveying of the same, is taking place.

The shaftless spiral of the second combination is dimensioned so as to have a pitch, a blade width, a cross-section and/or a speed of rotation of the spiral which causes the transport capacity of the second combination exceed the conveying capacity to which the first combination has been adjusted. As a result a compression of material following accumulation of material in the discharge section 16 is avoided. Such a compression could lead to great mechanical stresses on the casing as well as spiral and could lead to these means having to be over-dimensioned at least in the transition region in order to obtain the necessary mechanical stability. As a rule the conveying capacity of the second combination is regulated in each application by means of the speed of rotation and/or the thread pitch of the second spiral.

As an example of suitable data for the second combination the spiral may be rotated at a speed of approx. 30–80 rpm, preferably 40–50 rpm, the spiral may have a diameter of approx. 150–400 mm, preferably approx. 200–300 mm, the ratio between the pitch of the spiral and its diameter may be greater than approx. 0.30, as a rule greater than aprox. 0.50 and preferably greater than approx. 0.75, and the width of the screw-blade may constitute approx. 20–40%, preferably approx. 25–35% of the spiral diameter. The width of the screw-blade here refers to the extension of the screw-blade in a direction corresponding substantially to a radial direction from the geometric center axis of the spirals. For certain materials extremely large thread pitches may be used, for example, a thread pitch of the order of magnitude of the outer diameter of the spiral. By using a large thread pitch the spiral is stiffened.

In the embodiments where the discharge section of the second casing 20 is connected to a subsequent combination of casing 30 and spiral 31 it has been found surprisingly to be possible to allow the second casing as described above to open from underneath into the casing of the third combination (see FIG. 4), that is to say to allow the casing of the third combination to lack a boundary surface in the region of the discharge opening of the second casing. The reason is that, surprisingly, it has been found that on rotation of the third spiral around its axis, and on feeding of material into the third casing through a feed opening arranged as described above, the material present in the second combination and in the joint hinders the material introduced into the third casing from falling back down into the second casing, as a result of which on rotation of the third spiral the supplied material is conveyed in the direction towards the discharge end of the third casing.

In FIG. 5a is shown how the arrangement co-operates with two receiving tanks 4, whereas FIG. 5b shows how the arrangement equally simply co-operates with several, for example four, such receiving tanks. Because the combination 3 is turnable, and as a rule is provided with a number of unloading openings, it will be evident that it is easy to achieve good filling even with material which has steep drop surfaces. Owing to the combination 3 being provided with a spiral capable of pushing and a spiral end free at the discharge end with axial discharge facilities, it is also evident that in certain applications the tanks are filled by the material being pressed out into the tanks. The arrows A in FIG. 5a, 5b mark the path of movement of the material.

The casing cross-section in the third combination is preferably U-shaped. In applications where the material is to be pressed out into the tanks a substantially circular cross-section is chosen as a rule, at least in the discharge section of the arrangement.

In the above description it is specified that the first combination 1 comprises a spiral thread 11 lacking a mechanical central shaft. It is the task of the first combination to constitute the feeding means for the supply of material into the casing 20 of the second combination 2 through the feed opening 22 of the latter. It will be obvious to those skilled in the art that the invention embraces the possibility, especially when the first combination is short, to allow the first spiral thread to be a conveyor screw provided with shaft. The essential point for the effect aimed at is that the first spiral thread terminates closely adjoining the region through which passes the screw-blade 58 of the spiral 21 of the second combination.

The above detailed description made reference only to a limited number of embodiments of the invention, but it will be readily appreciated by those skilled in the art that the invention embraces a great number of embodiments within the scope of the following claims.

I claim:

1. Apparatus for conveying particulate material from a lower level to a higher level comprising a first conveyor combination including a casing and a spiral drive element arranged rotatably in said casing, a second conveyor combination coupled to said first conveyor combination and including a casing inclined upwardly with respect to the casing of said first conveyor combination and a shaftless spiral drive element comprising a spiral screwblade arranged rotatably in said casing, said casing of the first conveyor combination having a discharge opening located axially of the first casing, said second casing having a boundary wall provided with a feed opening communicating with the discharge opening of the first casing, said spiral drive element of the first conveyor combination having a terminal end closely adjoining a region through which said screw blade of said shaftless spiral drive element of the second conveyor combination passes when said spiral drive element rotates, said casing of the second conveyor combination including a portion having a cross-section defining a corner.

2. Apparatus as claimed in claim 1 wherein said spiral, drive element in said first casing comprises a shaftless spiral.

3. Apparatus as claimed in claim 2 comprising an elongated body coaxially arranged with respect to the shaftless spiral in the first conveyor combination in a region adjoining a free end of the shaftless spiral.

4. Apparatus as claimed in claim 1 wherein said screw blade of the second conveyor combination has a width representing 20 to 40% of the diameter of the blade.

5. Apparatus as claimed in claim 4 wherein the width of the screw blade is between 25 to 35% of the diameter of the blade.

6. Apparatus as claimed in claim 1 wherein said casing of the second conveyor combination has a discharge section of substantially circular cross section.

7. Apparatus as claimed in claim 1 further comprising a third conveyor combination including a substantially horizontal casing and a shaftless spiral drive element comprising a spiral screw blade rotatably arranged in said casing, means coupling said casing of the third conveyor combination to a discharge section of the second casing, the third casing having a downwardly facing feed opening communicating with the discharge section of the second casing, said shaftless spiral drive element of the third conveyor combination extending adjacent to said feed opening, said casing of the third conveyor combination having a discharge section provided with at least one discharge opening through which the material is discharged.

8. Apparatus as claimed in claim 7 wherein the means which couples the second and third casings includes a rotatable coupling which provides a rotation of said third casing around said second casing such that the position of the discharge opening of the third casing can be adjusted.

9. Apparatus as claimed in claim 7 wherein said rotatable coupling permits rotation of said third casing around an axis coincident with the second casing.

10. Apparatus as claimed in claim 9 wherein the second casing is vertical.

11. Apparatus as claimed in claim 10 wherein said feed opening of the third casing and the discharge section of the second casing remain in communication during rotation of said third casing with respect to said second casing.

12. Apparatus for conveying particulate material from a lower level to a higher level comprising a first conveyor combination including a casing and a spiral drive element arranged rotatably in said casing, a second conveyor combination coupled to said first conveyor combination and including a casing inclined upwardly with respect to the casing of said first conveyor combination and a shaftless spiral drive element comprising a spiral screwblade arranged rotatably in said casing, said casing of the first conveyor combination having a discharge opening located axially of the first casing, said second casing having a boundary wall provided with a feed opening communicating with the discharge opening of the first casing, said spiral drive element of the first conveyor combination having a terminal end closely adjoining a region through which said screw blade of said shaftless spiral drive element of the second conveyor combination passes when said spiral drive element rotates, said casing of the second conveyor combination including a portion having a cross-section with a substantially longitudinally extending internal rib.

13. Apparatus as claimed in claim 12 wherein said spiral drive element in said first casing comprises a shaftless spiral.

14. Apparatus as claimed in claim 13 comprising an elongated body coaxially arranged with respect to the shaftless spiral in the first conveyor combination in a region adjoining a free end of the shaftless spiral.

15. Apparatus as claimed in claim 12 wherein said screw blade of the second conveyor combination has a width representing 20 to 40% of the diameter of the blade.

16. Apparatus as claimed in claim 15 wherein the width of the screw blade is between 25 and 35% of the diameter of the blade.

17. Apparatus as claimed in claim 12 wherein said casing of the second conveyor combination has a discharge section of substantially circular cross section.

18. Apparatus as claimed in claim 12 further comprising a third conveyor combination including a substantially horizontal casing and a shaftless spiral drive element comprising a spiral screw blade rotatably arranged in said casing, means coupling said casing of the third conveyor combination to a discharge section of the second casing, the third casing having a downwardly facing feed opening communicating with the discharge section of the second casing, said shaftless spiral drive element of the third conveyor combination extending adjacent to said feed opening, said casing of the third conveyor combination having a discharge section provided with at least one discharge opening through which the material is discharged.

19. Apparatus as claimed in claim 18 wherein the means which couples the second and third casings includes a rotatable coupling which provides a rotation of said third casing around said second casing such that the position of the discharge opening of the third casing can be adjusted.

20. Apparatus as claimed in claim 18 wherein said rotatable coupling permits rotation of said third casing around an axis coincident with the second casing.

21. Apparatus as claimed in claim 20 wherein the second casing is vertical.

22. Apparatus as claimed in claim 21 wherein said feed opening of the third casing and the discharge section of the second casing remain in communication during rotation of said third casing with respect to said second casing.

* * * * *